United States Patent [19]

Bevilacqua

[11] 4,177,385
[45] Dec. 4, 1979

[54] NUCLEAR FUEL STORAGE
[75] Inventor: Frank Bevilacqua, Windsor, Conn.
[73] Assignee: Combustion Engineering, Inc., Windsor, Conn.
[21] Appl. No.: 834,634
[22] Filed: Sep. 19, 1977
[51] Int. Cl.² ............................................. G21F 5/00
[52] U.S. Cl. ................................... 250/507; 250/518
[58] Field of Search ............... 250/506, 507, 515, 518; 176/84, 87, DIG. 2

[56] References Cited
U.S. PATENT DOCUMENTS

| | | | |
|---|---|---|---|
| 3,785,925 | 1/1974 | Jones | 250/506 |
| 4,004,154 | 1/1977 | Bevilacqua | 250/518 |
| 4,006,362 | 2/1977 | Mollon et al. | 250/518 |

Primary Examiner—Bruce C. Anderson
Attorney, Agent, or Firm—Edward L. Kochey, Jr.

[57] ABSTRACT

A method and apparatus for the storage of fuel in a stainless steel egg crate structure within a storage pool. Fuel is initially stored in a checkerboard pattern or in each opening if the fuel is of low enrichment. Additional fuel (or fuel of higher enrichment) is later stored by adding stainless steel angled plates within each opening, thereby forming flux traps between the openings. Still higher enrichment fuel is later stored by adding poison plates either with or without the stainless steel angles.

8 Claims, 6 Drawing Figures

NUCLEAR FUEL STORAGE

BACKGROUND OF THE INVENTION

This invention relates to nuclear fuel storage and in particular to a method and apparatus for storing fuel assemblies in a pool.

Reactor fuel element assemblies are frequently stored in storage pools which can accommodate either new or spent fuel assemblies. The pool is filled with water which may be borated. This supplies cooling of the assemblies as well as moderator and also poison if the water is borated. It is of course essential that the stored mass not be permitted to assume a geometry which is either critical or supercritical.

The storage pool must be provided during the initial construction of the plant so as to provide for storage of any fuel assemblies which would have to be removed from the reactor. The storage pool at this time need not be capable of storing its ultimate capacity. Investment in expensive materials as components of the storage assembly require a present investment if supplied with the initial storage rack. There is an obvious economic saving if such investment could be deferred.

Most storage arrangements are designed for a particular fuel enrichment and are, therefore, completely inadequate should fuel of additional enrichment have to be stored at some time in the future. While borated water may be used in the pool to compensate for this additional enrichment it is considered an unsafe practice to completely rely on the boron content. In the event that the pool develops a leak and water must be replaced with fresh water, the boron content is depleted. Furthermore, there is always a potential for an operating error whereby the boron concentration is not maintained at the safe level.

Storage racks have been designed utilizing the flux trap principle as illustrated in U.S. Pat. No. 4,004,154 issued to Frank Bevilacqua on Jan. 18, 1977. In such a device a stainless steel plate closely surrounds the fuel assembly being stored with water contained between the plates. Fast neutrons from the fuel pass through the plates and are slowed to thermal levels by the water. At the thermal level they are not able to return through the plates to the fuel. The required spacing for a particular fuel enrichment is calculated according to well known nuclear physics principles. There is an inherent expense in holding tolerances of a structure where multiple plates are involved and tolerances must be simultaneously held.

SUMMARY OF THE INVENTION

It is an object of the invention to defer a portion of the investment in a fuel storage rack for some years until increased capacity of the rack is required.

It is further an object to obtain the ability to store fuel of an enrichment greater than that which has been forecast.

It is a further object to reduce the cost of a flux trap type storage rack.

A nuclear fuel storage apparatus for use in a water filled pool is fabricated of a material such as stainless steel in a form of an egg crate structure having vertically extending openings. Adjacent openings have a common wall between them which extends throughout the height of the active length of the fuel to be stored. Fuel may be stored in this basic structure in a checkerboard pattern with high enrichment fuel or in all openings when the fuel is of low effective enrichment. A plurality of inserts of a material such as stainless steel are adapted to fit within these openings. The inserts have two plates, one parallel to each of two adjacent sides of an opening, and the plates extend throughout a length generally equal to or greater than the active length of the fuel to be stored. The plates are stored in a similar location in each opening so that a water gap and, therefore, a flux trap is formed between adjacent fuel storage locations. These inserts may be added at a later time and fuel of a higher enrichment may be stored in each opening.

When it is desired to store fuel of still greater enrichment, poison plates may be added to the water gap formed by the installed insert plates, or substituted for the insert plates. Alternately or in addition thereto fuel may be installed in high neutron absorption poison boxes which surround the fuel assembly to store fuel or still greater enrichment. It is normally expected that the inserts must be removed at this time because of physical problems of storing the same size fuel assembly with a surrounding box. Stainless steel boxes installed in this manner would function to produce an effective flux trap.

The stainless steel inserts and the poison plates are each not required until the capacity of the basic egg crate structure is approached. Purchase of these items can, therefore, be deferred for many years. Should the fuel to be stored be of higher enrichment than initially forecast, the deferred decision on the poison plates makes it possible to obtain increased poison in the plates to satisfy the newly discovered requirement.

Even if the storage rack were to be initially supplied with all the inserts in place in accordance with the flux trap principle, construction costs may be reduced. While basic tolerances must still be maintained on the original egg crate structure, the inserts are formed with their own tolerances, which while related to the basic structure tolerances need not be simultaneously maintained.

DESCRIPTION OF THE PREFERRED EMBODIMENT

Figure 1:
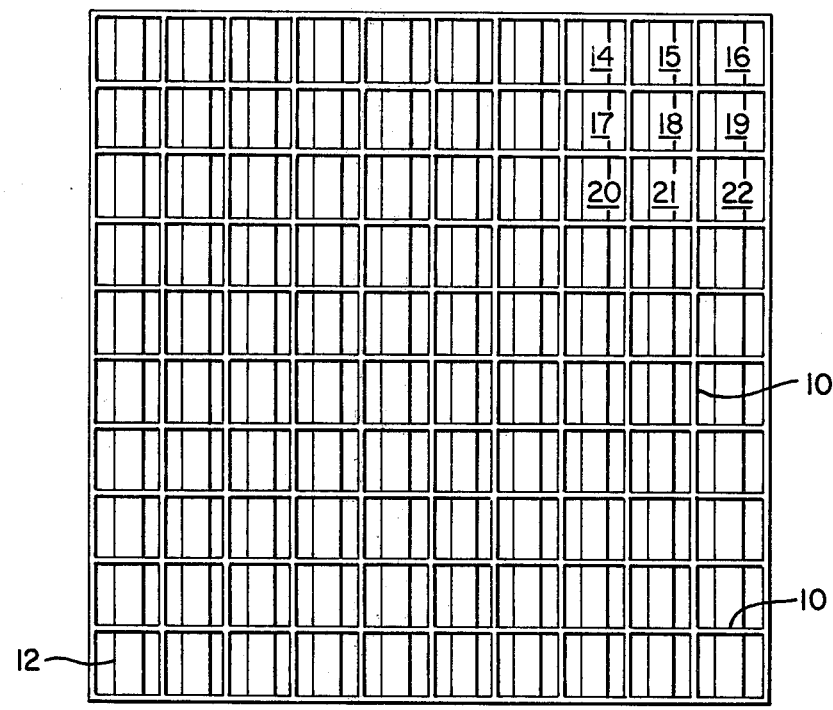
FIG. 1 is a plan view illustrating the general arrangement of a fuel storage rack.
Figure 2:
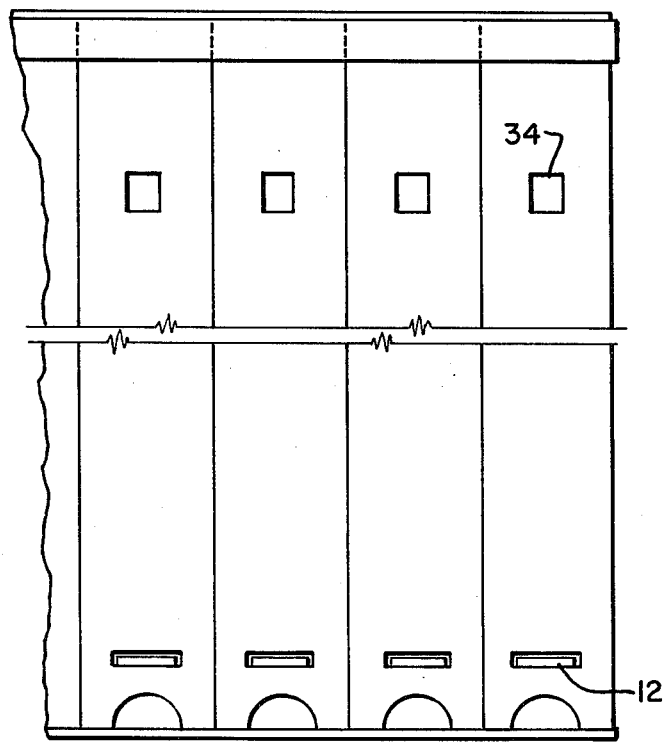
FIG. 2 is a partial side elevation of FIG. 1.

FIGS. 1 and 2 are general arrangement view, wherein an egg crate structure is formed of stainless steel plates 10. These plates extending through the entire height of the rack must be generally equal to or greater in length than the active length of the fuel assemblies to be stored and must be coterminous therewith when the assemblies are stored within the rack. Support bars 12 pass through the lower portion of the rack for support of the fuel assemblies to be stored. This egg crate structure forms vertically extending rectangular openings 14 through 22. Fuel of low effective enrichment may be stored in each of these openings. Fuel of a higher enrichment (typically about 3.5 to 4.0 weight percent U 235) which is normally expected to be stored, may be safely stored in a checkerboard pattern using openings 15, 17, 19, 21 etc. With practical center to center spacing, this will normally provide safe storage of the highest enriched fuel expected to be stored. Since only one half the openings are used, the capacity of the rack with such a storage mode is limited to one half the possible capacity.

Figure 3:
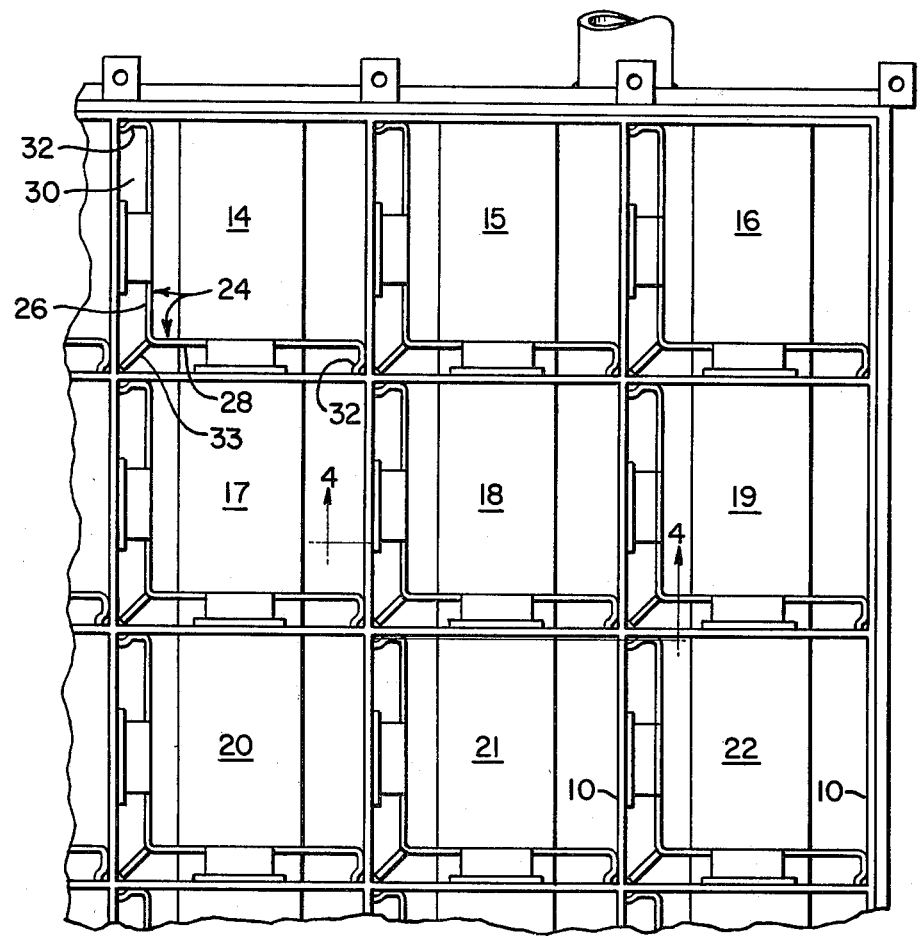
FIG. 3 is a detail of nine boxes of the assembly with angle type inserts installed.

As the capacity of the storage rack in this mode is approached, it may be desirable to increase the capacity. This is accomplished by adding inserts 24 of stainless steel or some other neutron absorbing material as illustrated in FIG. 3. These inserts are formed of two plates 26 and 28 which are parallel to adjacent sides of the opening and are spaced therefrom a predetermined distance. The appropriate distances and fuel enrichment capability are calculated by considering the total mass of the fuel to be stored, the plates 10 of the egg crate structure, the inserts 26, and the water gap 30 between the sides of the boxes and the plates.

Figure 4:
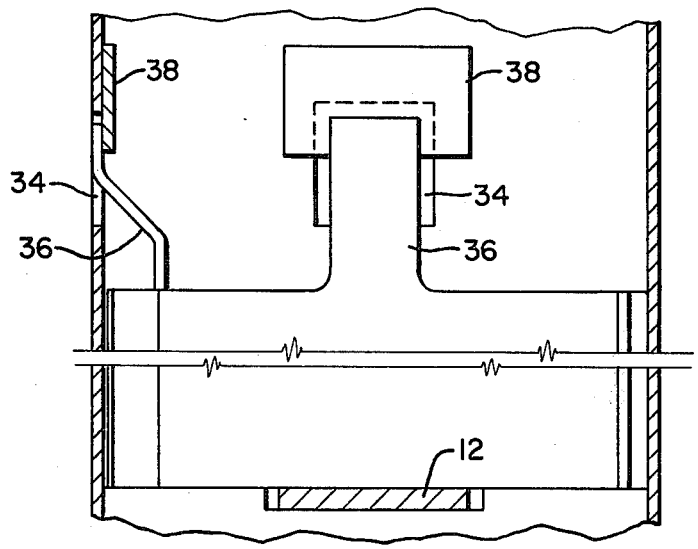
FIG. 4 is a sectional elevation through one of the boxes of FIG. 3, with the near side of the box removed, showing the location of the insert.

Each insert has a bent portion, or spacer 32 at each end and a spacer piece 33 at the intervening corner. These cooperate to maintain the insert properly spaced within the opening and to maintain the predetermined space of the water gap 30. As best seen in FIGS. 2 and 4 rectangular openings 34 are supplied in plates 10 of the egg crate structure. The inserts have an upwardly extending tab 36 which is bent so as to lock into the opening 34. Tab extensions 38 are welded to the tab and prevent the tab from passing through the opening 34. The insert is supported on plate 12 and the tabs function to maintain the insert in position and retain the insert in position when the stored fuel assemblies are withdrawn.

Figure 5:
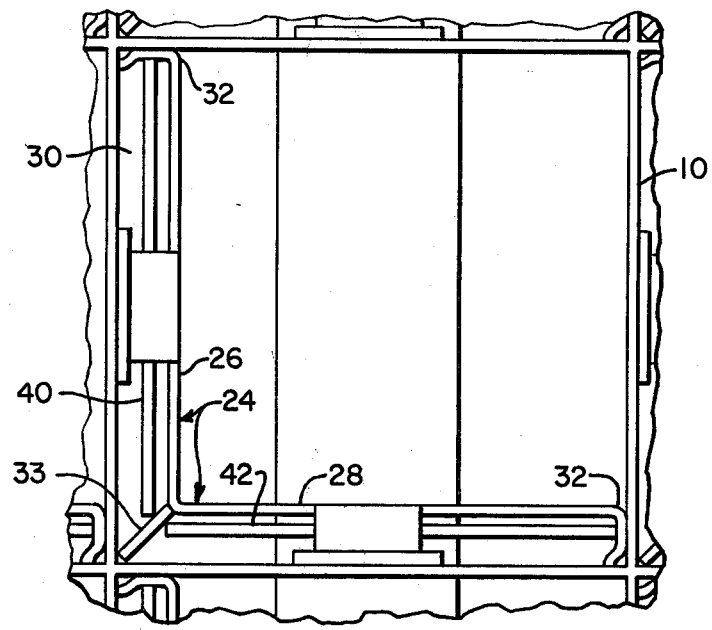
FIG. 5 shows a rack opening with angle inserts installed and with poison plates additionally installed.

When fuel of still higher enrichment must be stored there are several options available, each of which involves the use of a high neutron absorbing plate such as material containing boron 10 or hafnium. Referring to FIG. 5, poison plates 40 and 42 are installed in the water gap between the insert 24 and the side plates 10 of the opening. In the particular construction illustrated these plates may be inseted by springing back tab 38 and inserting the plate. They may be supported either from the tab itself or on an additional support member added to the egg crate structure at the bottom. The enrichment of fuel which may be stored at this time must be calculated taking into consideration the poison plate as well as the times discussed with respect to the flux trap principle arrangement.

Figure 6:
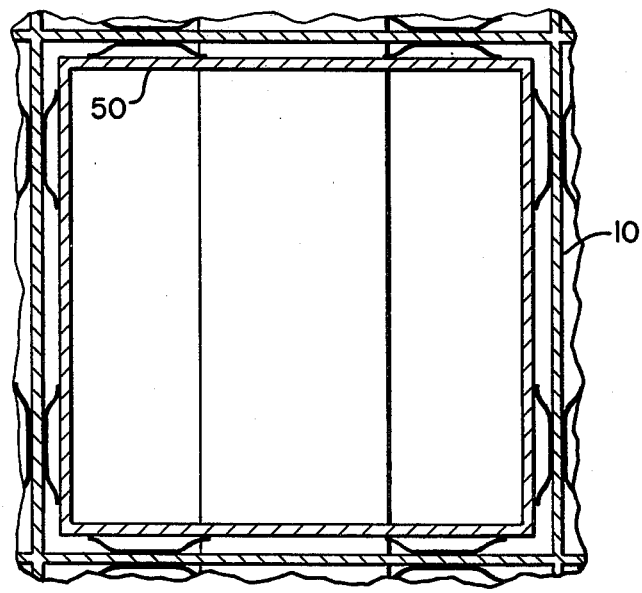
FIG. 6 illustrates a rack opening with a neutron poison box installed.

An alternate method of storing additionally enriched fuel is illustrated in FIG. 6 wherein the poison plates 40 and 42 of FIG. 5 are removed along with the insert 24. A rectangular storage box 50 of stainless steel or a higher neutron absorber poison material, which is commercially available, may be installed in the openings and supported on bars 12. The enrichment of fuel which may be stored in this mode must again be calculated by nuclear physics principles according to the physical structure which exists.

What is claimed is:

1. A nuclear fuel storage apparatus for use in a water filled pool comprising: an egg crate structure of thermal neutron absorbing material, having vertically extending rectangular openings, adjacent openings having a common wall therebetween extending through a height generally equal to or exceeding the active length of the fuel to be stored; a plurality of inserts of neutron absorbing material, each adapted to slidably fit within a respective opening, said inserts each having a first plate parallel to one side of the openings and a second plate parallel to an adjacent side of the opening, said plates adjacently connected and having a length generally equal to or greater than the active length of the fuel to be stored; means for holding said inserts within the openings, with the first and second plates spaced a predetermined distance from the parallel sides of the opening; and means for supporting fuel to be stored at locations bounded by said plates and to sides of the respective opening.

2. An apparatus as in claim 1 wherein the plates in adjacent openings are located in similar positions in each opening.

3. An apparatus as in claim 2 wherein said first and second plates form a unitary structure in the form of a single bent plate.

4. An apparatus as in claim 3 wherein said neutron absorbing material is stainless steel.

5. An apparatus as in claim 4 wherein said rectangular openings are square.

6. In a water pool fuel storage rack having a plurality of vertical rectangular openings with a common wall between the openings and immersed in water a method of managing fuel storage comprising: initially placing fuel assemblies in a checkerboard pattern until the capacity of the rack in the checkerboard mode is approached; subsequently inserting plates in the openings parallel to and spaced from two adjacent sides of selected openings, thereby forming a water gap therebetween and a flux trap fuel storage space between the plates and opposite sides of the openings, thereafter storing fuel in said flux trap storage spaces of an enrichment such that the total mass is subcritical when considering the common walls, the plates, and the water gap.

7. The method of claim 6 including also storing a fuel of greater enrichment by adding poison plates in a plurality of openings in at least two planes within each opening; and storing the fuel of greater enrichment in the openings to which the poison plates have been added.

8. The method of claim 7 including the further steps of: storing fuel of still greater enrichment by removing said plates of thermal neutron absorbing material and said poison plates from said openings; inserting rectangular boxes of poison material within said openings; and storing fuel within said boxes.

* * * * *